United States Patent [19]

Fisher et al.

[11] Patent Number: 4,630,489
[45] Date of Patent: Dec. 23, 1986

[54] FLOW SENSOR FOR PARTICULATE MATERIAL

[76] Inventors: Glen W. Fisher, 708 - 99th SE., Bellevue, Wash. 98004; Lionel C. Helweg, 640 SW. 124th St., Seattle, Wash. 98146; Rick S. Jones, 5030 51st Ave. SW., Seattle, Wash. 98136

[21] Appl. No.: 641,382

[22] Filed: Aug. 16, 1984

[51] Int. Cl.⁴ .................................................. G01F 1/06
[52] U.S. Cl. .................................................. 73/861.87
[58] Field of Search ........... 73/861.87, 861.88, 861.79, 73/861.04; 340/606, 610

[56] References Cited

U.S. PATENT DOCUMENTS 2,963,907 12/1960 Sylvest .............................. 73/861.87
3,426,595 2/1969 Skelton ............................. 73/861.87

Primary Examiner—Donald O. Woodiel
Attorney, Agent, or Firm—Dowrey & Cross

[57] ABSTRACT

An apparatus for sensing the flow of particulate material so disclosed which includes a paddle wheel and a sensor for detecting the relation thereof. A mounting block supports the sensor and paddle wheel and is adapted for use with a plurality of different sizes of conduit. Control electronics are connected to the sensor to produce signals representative of rotation of the paddle wheel and of the rotation rate. The paddle wheel may be formed from a single flat sheet of material.

12 Claims, 7 Drawing Figures

FLOW SENSOR FOR PARTICULATE MATERIAL

FIELD OF THE INVENTION

The present invention relates to the sensing of flow of particulate material through an inclined conduit such as the flowing of grains from a bin into a processing apparatus.

SUMMARY OF THE INVENTION

In milling and other industries in which a flowable particulate material is used, the sensing of flow of the material within a conduit can be extremely important for control of equipment or sensing of malfunctions. For example, in the flour milling industry, successive parallel rolls are used to grind wheat into flour. These rolls are spring biased toward one another and almost touch during the milling operation. If the supply of material to the rolls is interrupted, the rolls can close together. Since one roller is rotating at $2\frac{1}{2}$ times the rate of the other, this closure can result in severe damage to the equipment and can also result in a fire.

A second example which illustrates the importance of monitoring flow is found in the grain tempering process. It is known that mills function better and produce a better grade of product with less monitoring and adjustment of the milling equipment when the moisture level of the wheat is uniform. Small quantities of water are thus added to wheat according to their moisture level by means of a mixer. Should the supply of wheat to the mixer fall outside certain bounds, insufficient or excessive water may be applied to the wheat resulting in a degraded product. In the worst case where flow of the wheat to the mixer stops completely, the mixer may fill up and spill water into the mill.

Notwithstanding the need to monitor such processes the tendency in flour milling and in other industries has been toward automation and reduction of the work force. Since fewer and fewer workers are available for monitoring of the equipment, in the milling industry it has been the practice to use flow sensors to monitor the flow of material through conduits and the like, either to produce an alarm signal or to control the operation of equipment. One type of flow switch in common use employs a plate hinged above the expected level of product flow which hangs down toward the bottom of the conduit. As product flows in the conduit the plate is deflected and operates a microswitch or other sensor or indicator. A second type of flow switch employs a light source and detector pair placed on opposite sides of the conduit. Flow of product in the conduit breaks the light beam between the light source and detector and again indicates a flow of product.

Both of these sensors suffer from one important failing. Should a large object become lodged in the vicinity of the sensor either type of sensor may be blocked and give a false reading. Likewise, should a blockage in the conduit downstream from the sensor result in particulate material backing up within the conduit both sensors will continue to register the flow of particulate material when in fact there is none. as set forth above, such an event could result in damage to equipment or production of a product having reduced quality.

A simple, reliable flow switch is thus needed which senses the actual flow of material and which preferably will indicate a no-flow condition if the mechanism is damaged or otherwise jammed. In addition, a flow switch is desired which can be easily set to indicate the onset of flow of material above a certain level. Processes sensitive to changes in the amount of material received from the conduit can thus be monitored.

BRIEF DESCRIPTION OF THE INVENTION

The present invention provides a flow sensing device which responds to actual flow of the material. This device can also be used to monitor changes in the depth of the flowing material, and can be adjusted to begin indication of material flow only after a desired depth of material flow has been achieved. This flow monitoring may be easily modified to work with conduits of a variety of shapes and diameters, is extremely simple in its construction and, above all, is reliable. These and other desirable features of the present flow sensing device are accomplished without the use of complicated mechanisms.

The flow sensing device of the present invention employs a shaft mounted rotor which is rotated by the passage of particulate material. This rotor may comprise a paddle wheel having a plurality of blades extending generally perpendicular to the path of flow of the particulate material. Rotation of this paddle wheel is monitored by means of a conventional proximity detector circuit which includes a sensor contained within a mounting block and positioned in close proximity to the paddle wheel. This sensor detects the passage of the spokes of the paddle wheel to indicate rotation of the wheel induced by a flow of particulate material.

The paddle wheel is mounted on a shaft which is rotatably supported by the mounting block. The upper surface of the mounting block is formed for mounting in a variety of sizes of housings. For each of these conduit sizes, however, the outer edges of the paddle wheel blades at their lowest rotational position remain generally tangent to the interior wall of the housing in spite of the change in housing diameter. This housing may comprise a short section of conduit material of the appropriate diameter. Adjustment screws are provided to increase or decrease the minimum distance between the blades of the paddle wheel and the housing wall. This adjustment permits the paddle wheel to approach very close to the wall of the housing when a flow of finely divided material such as flour is to be sensed. For particulate material of large maximum particle size, such as corn, the paddle wheel can be adjusted to have a minimum distance greater than the maximum particle size so as to avoid jamming. The paddle wheel may be formed quickly and economically from a single piece of sheet metal. The mounting block is formed to intrude to the least extent possible into the housing to minimize the amount of the cross-sectional area of the housing which is obstructed.

Where a cylindrical housing is used, the level of particulate material which first impacts the paddle wheel can be adjusted by rotating the housing relative to the conduit through which the material is flowing and to thereby move the paddle wheel away from the lowermost point in the housing. The housing may also be V-shaped, or rectangular, or of some other shape in cross-section, to correspond to the configuration of the conduit. The paddle wheel may also be engaged with material moved past it by a belt type conveyor.

Tandem pairs of flow sensing devices of the present invention may be used in series to sense flow above a desired minimum and flow above a desired maximum. Sensing of flow within a certain depth range can thus be monitored. In addition, it has been found that the rotational speed of the paddle wheel increases as the depth of material increases. Since the proximity detection sensor produces electronic pulses corresponding to increments of rotation of the paddle wheel, the rate of rotation of the paddle wheel can be monitored to detect minor variation in the level of flow of the particulate material by counting the number of such pulses which occurs within a preset time period. The level of particulate material flowing through the conduit can thus be monitored. This can be extremely important in the case of processes which are sensitive to the amount of material flowing, such as the distribution of material which indicates a balanced condition within the milling process.

DETAILED DESCRIPTION OF THE PREFERRED EMBODIMENT

Figure 1:
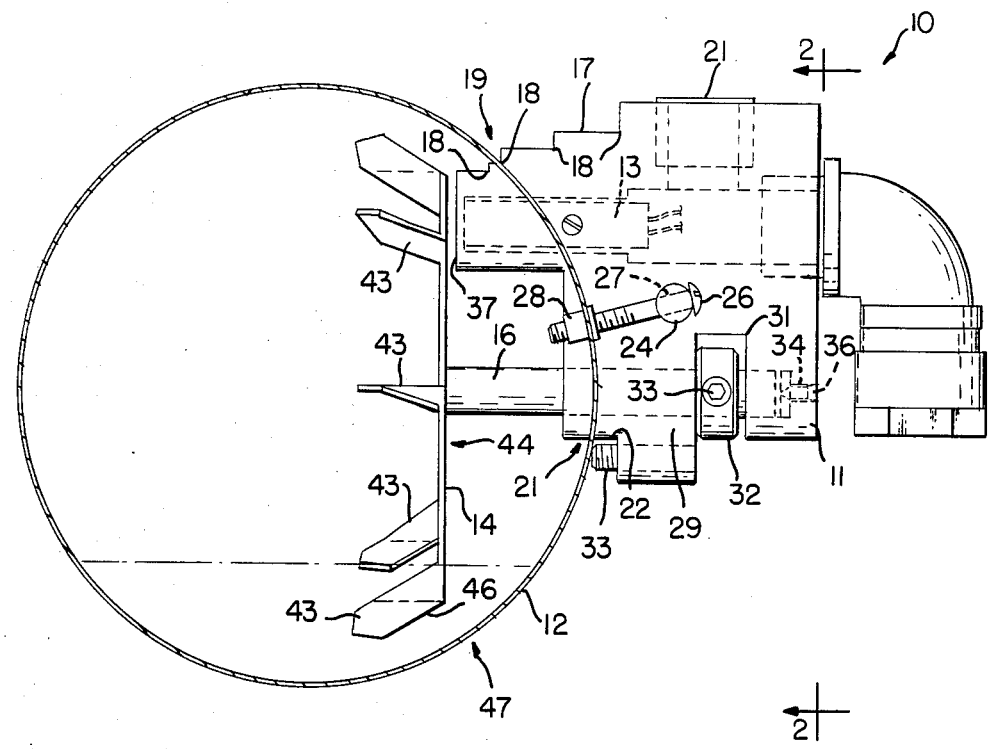
FIG. 1 is a side elevation of a flow sensing device according to the present invention.

As shown in FIG. 1, the flow sensing apparatus 10 of the present invention includes a mounting block 11 which extends through a rectangular aperture in a housing 12. A proximity sensor 13 is mounted in the block 11 and a paddle wheel 14 is mounted within the housing at the end of a shaft 16 which is rotatably mounted in the block 11.

The upper surface 17 of the mounting block 11 is formed to include a plurality of steps 18 for engaging a housing 12 along the upper edge 19 of the slot through which the mounting block 11 extends.

The mounting block 11 engages the housing along the lower edge 21 of the slot along a lower surface 22 of the mounting block. A set screw 23 is threaded into the mounting block and extends therefrom to engage the side wall of the housing 12 at a location below the lower edge 21 of the slot. A rod 24 made of nylon or other resilient material extends through an aperture in the center of the mounting block. A screw 26 is positioned on each side of the mounting block and extends through an aperture 27 in the corresponding end of the rod 24. The screws 26 are threaded into nuts 28 which are press fit or otherwise fastened to the housing 12. Once the set screw 23 is adjusted to the desired position, the screws 26 can be tightened to pull the step 18 and the set screw 23 into firm engagement with the housing 12. Since the rod 24 is made of a resilient material, the screws 26 can be tightened firmly without risk of deforming the mounting block 11.

The shaft 16 on which the paddle wheel 14 is mounted extends into a bore 29 in the mounting block 11. The shaft extends through a notch 31 cut in to the bottom of the mounting block 11 and a collar 32 is positioned within the notch 31 and secured to the shaft 16 by means of a set screw 33. This collar prevents the shaft 16 from moving out of the bore 29. A set screw 34 is threaded into a bore 36 in the back of the mounting block 11 into close proximity with the end of the shaft 16. This set screw 34 provides adjustment of the amount of axial free play in the shaft 16 and controls the minimum spacing of the paddle wheel 14 from the surface 37 of the mounting block 11 behind which the proximity sensor 13 is mounted.

Figure 2:
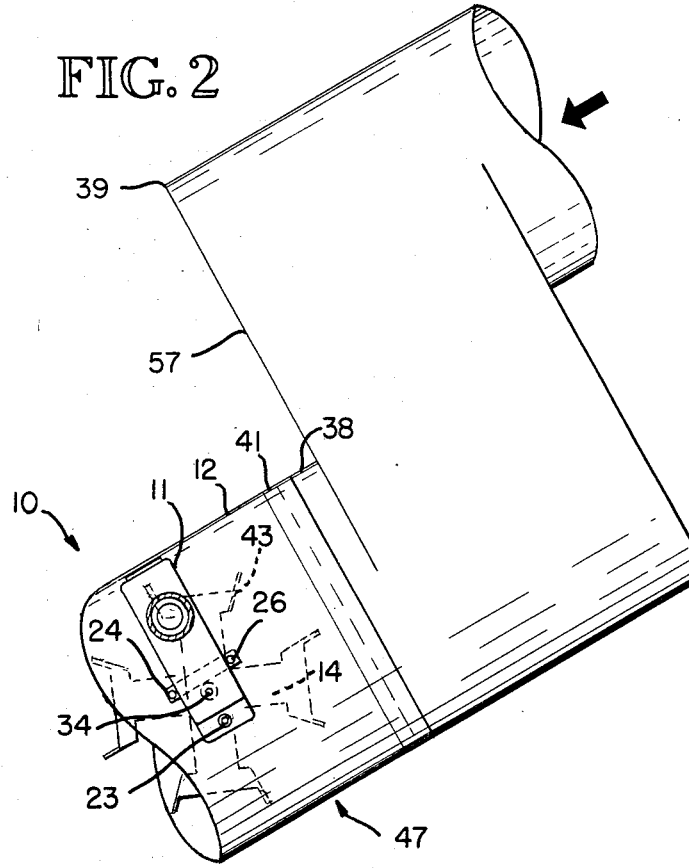
FIG. 2 is a side elevation of the device of FIG. 1 connected to a flow control dead box.

As shown in FIG. 2 the flow sensing device 10 of the present invention may be connected to conduit of a diameter equal to that of the housing 12 or to the outlet 38 of a dead box 39 by any of a variety of known means. One such method involves the fitting of a rubber sleeve around the junction 41 between the housing 12 and outlet 38. A metal band 42 is then clamped in place over the rubber sleeve. The band 42 may be loosened to permit rotation of the housing 12 about its longitudinal axis as desired.

Referring next to FIGS. 1 and 2, the paddle wheel 14 is mounted on the end of the shaft 16 and includes a plurality of blades 43 which extend outward from the back plate 44. The outer edge 46 of each of the blades 43 is angled such that it is approximately parallel to a line tangent to the housing 12 at the point 47 at which the blade 43 most closely approaches the bottom of the housing 12 as the paddle wheel is rotated. This minimizes the variation in distance between the outer edge 46 of the blade 43 and curved wall of the the housing 12.

The minimum distance between this lower edge 46 and the housing 12 can be adjusted by loosening the screws 26, adjusting the set screw 23 to the desired position and retightening the screws 26. Thus, if the device 10 of FIG. 1 is to be used with a fine particulate material such as flour the set screw 23 may be adjusted outward toward the housing 12 to move the blade 43 closer to the housing 12. If, however, the flow sensing apparatus is to be used with a coarse-grained particulate material such as corn, the lower edge 46 must not approach the housing so closely that a kernel of corn could become lodged between the blade 43 and housing 12, causing the paddle wheel to jam. In such case, the set screw may be retracted into the mounting block 11 and the screws 26 tightened to draw the housing 12 away from the lower edge 46 of the blade 43.

Figure 3:
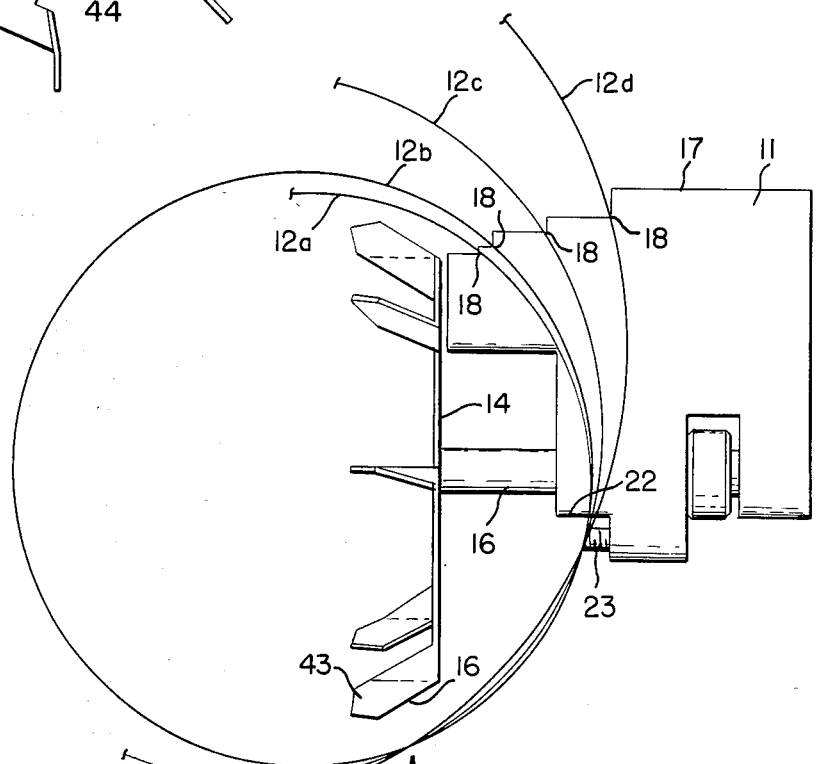
FIG. 3 is a side elevation of the device of FIG. 1 illustrating the mounting thereof in housings of various diameters.

FIG. 3 illustrates the use of the mounting block 11 with a variety of sizes of housing 12a-d. When the housings 12a-d of varying diameter are engaged with the proper step 18 in the upper surface 17 of the mounting block 11 each such housing 12a-d is in a generally abutting relationship with the lower surface 22 of the mounting block 11 and the set screw 23 at approximately the same points. Likewise, a line tangent to each of the housings 12a-d taken at the point 47 is approximately parallel to the outer edge 46 of the blade 43. Thus, the present flow sensing device 10 may be adapted to work with a variety of conduit sizes merely by choosing a housing 12 of appropriate size. Additional steps 18 can be provided in the upper surface 17 of the mounting block 11 such that housings 12 of various shapes and sizes can be used.

Figure 4:
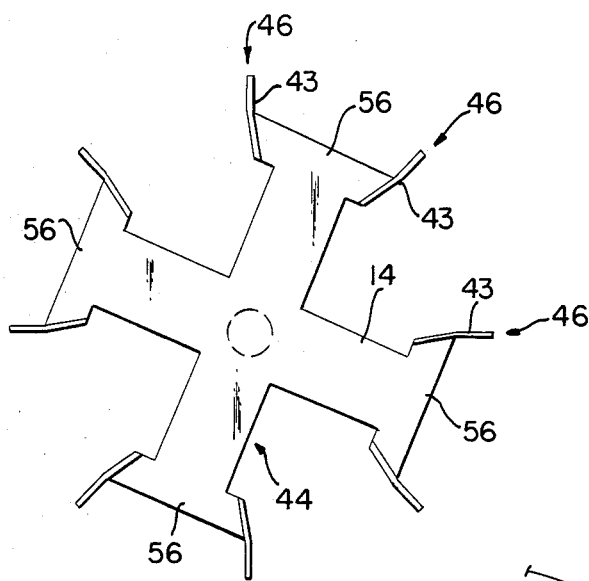
FIG. 4 is an end elevation of a paddle wheel according to the present invention.
Figure 5:
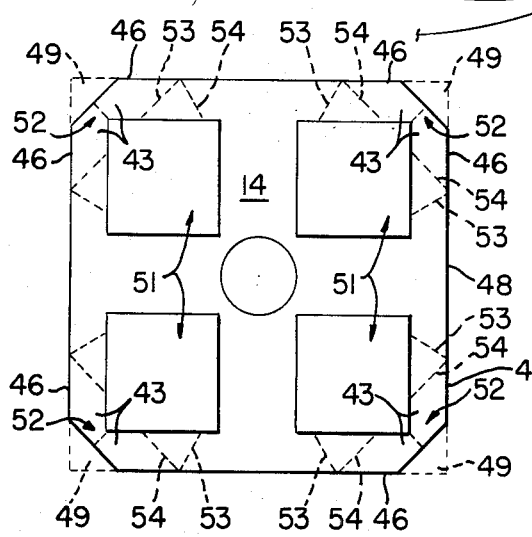
FIG. 5 is a side elevation of a generally square piece of material from which the blade of FIG. 3 may be formed.

Referring next to FIGS. 4 and 5, the paddle wheel 14 of the present invention may be economically and quickly formed from a square piece of metal. In order to minimize periodic variations in the rate of rotation of the paddle wheel 14, it is desirable that the blades 43 be equally spaced about the axis of rotation of the paddle wheel 14. Additionally, it is desirable that a major portion of each of the blades 43 which engage the particulate material be aligned in a plane which extends radially from the axis of rotation of the paddle wheel. In order to meet these criteria the paddle wheel 14 may be formed from a square sheet of material 48. This is accomplished by removing the corner pieces 49 from the square sheet 48 and forming four rectangular apertures 51 in the metal plate 48 which are symmetrically distributed about the center of the plate 48. A cut 52 is then made extending radially outward from one corner of each of the square apertures 51. The blades 43 of the paddle wheel 14 are then formed by bending the plate 48 along each of the first bending lines 53, the position and angle of the bending line 53 being chosen such that the lower edges 46 of the blades 43 will extend approximately parallel to a line tangent to the housing 12 at the point 47 and also such that the paddles will be uniformly spaced from one another. The pitch of the outer portion of the blades 43 may then be adjusted, for example to be coplanar with the axis of rotation of the blade, by bending them along the second bending lines 54.

It should be noted, of course, that this results in a paddle wheel 14 having eight blades 43. Paddle wheels having different numbers of blades or different configurations can, of course, be formed in like manner from sheets of other geometric shapes. For example, a triangular sheet of metal could be formed with three triangular apertures. Such a paddle wheel would have only six blades.

As set forth above, rotation of the paddle wheel is detected by a sensor head 13 operating in conjunction with control electronics (not shown). As the paddle wheel rotates, the outer sections 56 of the back plate 44 alternately pass into and out of proximity to the sensor 13. This sensor 13 may be one of any number of conventional sensor types which may be associated with appropriate control circuitry. Such sensors and circuitry are available from numerous sources including Turck, Inc. of Minneapolis, Minnesota, U.S.A. and Red Lion Controls of York, Pennsylvania, U.S.A. One such sensor and control circuit combination which may be employed operates as follows. As the paddle wheel rotates such that the outer portions 56 of the back plate 44 approach and move away from the sensor 13 an electrical signal is generated. Since the paddle wheel of FIG. 4 includes four such outer sections 56, four electrical pulses will be generated by the sensor 13 for each rotation of the paddle wheel. The control electronics monitor these pulses and include several outputs which change in response thereto. If, during a preset time period, no pulse is received by the control electronics, a signal is provided at one terminal of the control electronics to indicate the absence of rotation in the paddle wheel. The control electronics can also count the number of pulses received within each time period and output a second signal at a second terminal to indicate that the paddle wheel is rotating at a rate which exceeds or falls below a predetermined value. These signals can then be used in a known manner to produce an alarm indication or to enable or disable the operation of equipment. Two electronic control circuits can also be connected to the sensor with one circuit set to produce an output signal when the paddle is rotating at or above a preset minimum rate and the second conduit set to produce a signal when the paddle is rotating at or below a preset maximum rate. Rotation of the paddle within a range of rates may thus be monitored.

The flow sensing device of the present invention may be used as follows to detect the flow of particulate material through the housing 12. As illustrated in FIG. 2 the housing 12 is first joined to a conduit or to the outlet 38 of a dead box 39 to provide a source of particulate material. The longitudinal axis of the housing and associated conduit are positioned at an angle such that the particulate material will flow downwardly through them. As the particulate material encounters the blades 43 of the paddle wheel 14, the paddle wheel commences rotation. As set forth above, this results in a signal being produced by the proximity sensor which is interpreted by the control electronics to produce a signal indicating the flow of particulate material within the conduit.

Figure 6A:
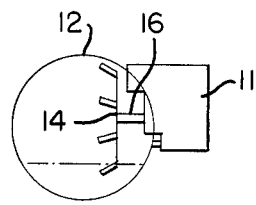
FIGS. 6A and 6B are schematic representations of the device of FIG. 1 showing the positioning of the device for sensing various levels of flowing particulate material.
Figure 6B:
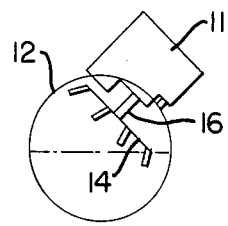

As shown in FIGS. 6A and 6B, the housing 12 may be rotated relative to the conduit so that a signal indicative of the flow of particulate material within the housing 12 will be given only when the depth of material will initiate rotation of the paddle wheel 14. Such rotation, of course, will result in a signal being produced at a terminal of the control electronics that material is flowing in the conduit. The housing 12 of FIG. 6A is positioned such that a thin layer of material flowing through the housing 12 will initiate rotation of the paddle wheel 14. By contrast, the housing 12 shown in FIG. 6B has been rotated relative to the conduit such that the particulate material must reach a great depth before it begins to engage the blades 43 and to rotate the paddle wheel. Since the volumetric flow rate of material at any point in an inclined conduit increases with increasing depth, the flow sensing device 10 of the present invention may be positioned to sense whether any material is flowing in the conduit or to sense whether a predetermined level of flow of particulate material has been achieved. In addition, two flow sensing devices 10 may be placed in series with one positioned to detect a desired minimum flow depth and the other positioned to detect a maximum desired depth of flow. The depth of flowing particulate material can thus be monitored to determine if it is within a desired range.

It has also been found that a single flow sensing device 10 can be used to sense variations in the depth and hence the volume of particulate material flowing through the housing 12. This is accomplished by monitoring the speed at which the paddle wheel rotates. It has been found that, within certain limits, the rotational speed of the paddle wheel 14 increases as the depth of the particulate material flowing through the housing 12 increases. As such, two electronic control circuits may be connected to the proximity sensor 13 as described above to monitor whether the paddle wheel 14 is rotating within the desired speed range and from this to determine whether the volumetric flow rate of the material is within the desired range.

A dead box 39 may advantageously be used upstream of the flow sensing device of the present invention in order to increase the accuracy of the indication given thereby. It will, of course, be appreciated that the velocity of particulate material increases as the material descends through the conduit. For a given volumetric flow rate, the level of particulate material flowing through the conduit decreases as the velocity of the particulate material increases. The dead box 39 is provided ahead of the flow sensing device to decrease the velocity of the particulate material and thereby increase the depth thereof. A greater variation in depth of the particulate material flowing through the housing 12 will thus result from a minor change in the volumetric flow rate of particulate material. This dead box functions by allowing the particulate material to impact against the wall 57, thus losing its velocity. The material then falls to the bottom of the dead box and commences its traverse of the housing 12 at a greatly reduced velocity.

It will be understood that the invention may be embodied in other specific forms without departing from the spirit thereof. The present embodiments are therefore to be considered as illustrative and not restrictive, and the invention is not to be limited to the details thereof but may be varied within the scope of the appended claims.

We claim:

1. An apparatus for sensing the flow of particulate material comprising a paddle wheel having a plurality of radially spaced blades for engaging a stream of particulate material.
   each of the blades of said paddle wheel including generally linear outer edge;
   mounting means for rotatably mounting said rotor means such that it rotates when it contacts a stream of flowing particulate material; a generally cylindrical housing for receiving a flow of particulate material to which said housing is connected such that said paddle wheel is positioned within said housing to contact a flow of particulate material therein, and
   such that, when each blade is moved to its lowest rotational position, the outer edge thereof is generally parallel to a line tangent to the adjacent wall of the housing;
   and means operatively associated with said rotor means for sensing rotation of said rotor means and producing an output signal in response to such rotation.

2. The apparatus of claim 1 wherein said mounting means comprises a mounting block having first and second surfaces for engaging a cylindrical housing, said first surface being formed with a plurality of housing engaging regions such that, when housings of different diameters are engaged by said mounting means at the appropriate housing engaging region the outer edge of a blade rotated toward its lowest position is generally parallel to a line tangent to the adjacent wall of such housings.

3. The apparatus of claim 2 wherein said mounting means comprises a mounting block having a stepped upper surface for engaging any of a plurality of sizes of housings.

4. The apparatus of claim 1 wherein said mounting block is adapted to receive a housing such that the distance between said housing and said blade may be adjusted.

5. An apparatus for sensing the flow of particulate material comprising:
   first mounting means for rotatably mounting said first rotor means such that it rotates when it contacts a stream of flowing particulate material;
   first means operatively associated with said first rotor means for sensing rotation of said first rotor means and producing an output signal in response to such rotation;
   second rotor means for contacting a stream of flowing particulate material;
   second mounting means for rotatably mounting said second rotor means such that it rotates when it contacts a stream of flowing particulate material;
   second means operatively associated with said second rotor means for sensing the rotation thereof and producing an output signal in response to said rotation, said first and second rotor means being mounted relative to one another to contact a single stream of particulate material, said second rotor means being positioned such that it will not contact said stream of particulate material until the depth of said stream exceeds the depth at which said first rotor contacts said stream.

6. An apparatus for sensing the flow of particulate material comprising:
   rotor means for contacting a stream of flowing particulate material comprising a paddle wheel having a plurality of radially spaced blades for engaging a stream of particulate material, and
   fabricated from an integral sheet of flat material by folding the blades outward from the plane of said material;
   mounting means for rotatably mounting said rotor means such that it rotates when it contacts a stream of flowing particulate material;
   means operatively associated with said rotor means for sensing rotation of said rotor means and producing an output signal in response to such rotation.

7. The apparatus of claim 6 wherein said blades are generally uniformly spaced about the center of said sheet and wherein the blades are further folded such that at least the outer portion of each such blade is coplanar with the axis of rotation of the paddle wheel.

8. The apparatus of claim 7 wherein said sheet is formed to define a plurality of apertures extending therethrough including a break extending outwardly from each such aperture to the edge of the sheet of material prior to the folding of the sheet.

9. An apparatus for sensing the flow of particulate material comprising;
   a shaft;
   a paddle wheel having a plurality of radially spaced blades folded outwardly from a planar back plate for contacting a stream of particulate material mounted on said shaft;
   sensor means mounted adjacent said paddle wheel for sensing rotation of said paddle wheel;
   a mounting block rotatably mounting said shaft;
   a housing for receiving a stream of particulate material; and
   means for resiliently biasing said mounting block into engagement with said housing such that said paddle wheel is positioned within said housing to engage a stream of material.

10. A flow sensor for particulate material comprising housing means including a tubular portion through which a stream of particulate material may flow; a paddle wheel having radial blades; paddle wheel mounting means mounting said paddle wheel within said tubular portion for rotation about an axis transverse to the direction of flow through said tubular portion, at a location offset from the longitudinal centerline of said tubular portion, such that said paddle wheel blades will be contacted, when in proximity to one side of said tubular portion, by a flowing particulate material stream of a predetermined depth causing said paddle wheel to rotate; and sensing means for sensing rotation of said paddle wheel and producing an output signal in response to said rotation.

11. The flow sensor of claim 10 wherein said mounting means and said tubular portion are so constructed and arranged that the position of said mounting means may be adjusted to effect a change in the attitude of the paddle wheel rotation axis with respect to the direction of flow through said tubular portion while maintaining paddle wheel blade proximity to one side of said tubular portion.

12. The flow sensor of claim 10 wherein said housing tubular portion is cylindrical; and wherein said paddle wheel comprises a rotor rotatably mounted by said mounting with said paddle wheel blades extending outward from said rotor at an obtuse angle with respect to the paddle wheel axis of rotation, and with each blade extending generally parallel to a line tangent to the side of said tubular portion when such blade is rotated into proximity to said tubular portion.

* * * * *